United States Patent [19]

Hains

[11] Patent Number: 5,321,525
[45] Date of Patent: Jun. 14, 1994

[54] CLUSTERED HALFTONING WITH DOT-TO-DOT ERROR DIFFUSION

[75] Inventor: Charles M. Hains, Altadena, Calif.
[73] Assignee: Xerox Corporation, Stamford, Conn.
[21] Appl. No.: 990,561
[22] Filed: Dec. 14, 1992
[51] Int. Cl.⁵ .............................................. H04N 1/40
[52] U.S. Cl. .................................. 358/456; 358/457; 358/458
[58] Field of Search ............... 358/456, 458, 298, 457, 358/460, 455, 448

[56] References Cited

U.S. PATENT DOCUMENTS

| | | | |
|---|---|---|---|
| 4,051,536 | 9/1977 | Roetling | 358/298 |
| 4,149,194 | 4/1979 | Holladay . | |
| 4,339,774 | 7/1982 | Temple . | |
| 4,633,327 | 12/1986 | Roetling . | |
| 4,654,721 | 3/1987 | Goertzel et al. . | |
| 4,924,322 | 5/1990 | Kurosawa et al. | 358/448 |
| 4,955,065 | 9/1990 | Ulichney | 382/50 |
| 5,045,952 | 9/1991 | Eschbach | 358/447 |
| 5,055,942 | 10/1991 | Levien | 358/456 |

OTHER PUBLICATIONS

P. Roetling, "Halftone Method With Edge Enhancement and Moire Supression", J. Opt. Soc. Amer. vol. 66, No. 10, Oct. 1976, pp. 985–986.
Floyd and Steinberg, "An Adaptive Algorithm for Spatial Greyscale", Proceedings of the SID 17/2, 75–77, (1976).
Jarvis et al., "A Survey of Techniques for the Display of Continuous Tone Pictures on Bilevel Displays", Computer Graphics and Image Processing, vol. 5, pp. 13–40, (1976).
Stucki, "MECCA–A Multiple-Error Correction Computation Algorithm for Bi-Level Image Hardcopy Reproduction", IBM Res. Rep. RZ 1060, (1981).
"On the Error Diffusion Technique for Electronic Halftoning", Billotet-Hoffmann and Bryngdahl, Proceedings of the SID, vol. 24/3, (1983), pp. 253–258.
Goertzel et al., "Digital Halftoning in the IBM 4250 Printer", IBM J. Res. Develop. vol. 31, No. 1, Jan. 1987.
Schroder, "Images from Computers", IEEE Spectrum, Mar. 1969, pp. 66–78.

Primary Examiner—Edward L. Coles, Sr.
Assistant Examiner—Scott A. Rogers
Attorney, Agent, or Firm—Mark Costello

[57] ABSTRACT

A method of quantizing pixel values in an image formed by a plurality of pixels, each pixel representing an optical density of the image at a location within the image, and having an original optical density value selected from one of a set of 'c' original optical density values that has a number of members larger than a desired output set of 'd' optical density values through a process of combined halftoning and cell-to-cell error diffusion. Initially, each pixel is modified with a pro rata portion of an error term determined for a previous halftone cell, or from the current cell in a previous interaction. A set of modified pixels, corresponding in position to an m × n halftone cell, are processed in accordance with a standard halftoning process, to derive a set of output pixels at one of d optical density levels. The calculated output density is used to address a lookup table having a stored set of empirical density values upon printing the dot represented by a halftone cell with the same count of optical density levels. The empirical density value for the cell returned from the lookup table is compared to a sum of the modified pixel values for the cell. The difference (which represents the difference in gray level input and the actual output) is directed on a weighted basis to the pixels of subsequently processed dots.

9 Claims, 1 Drawing Sheet

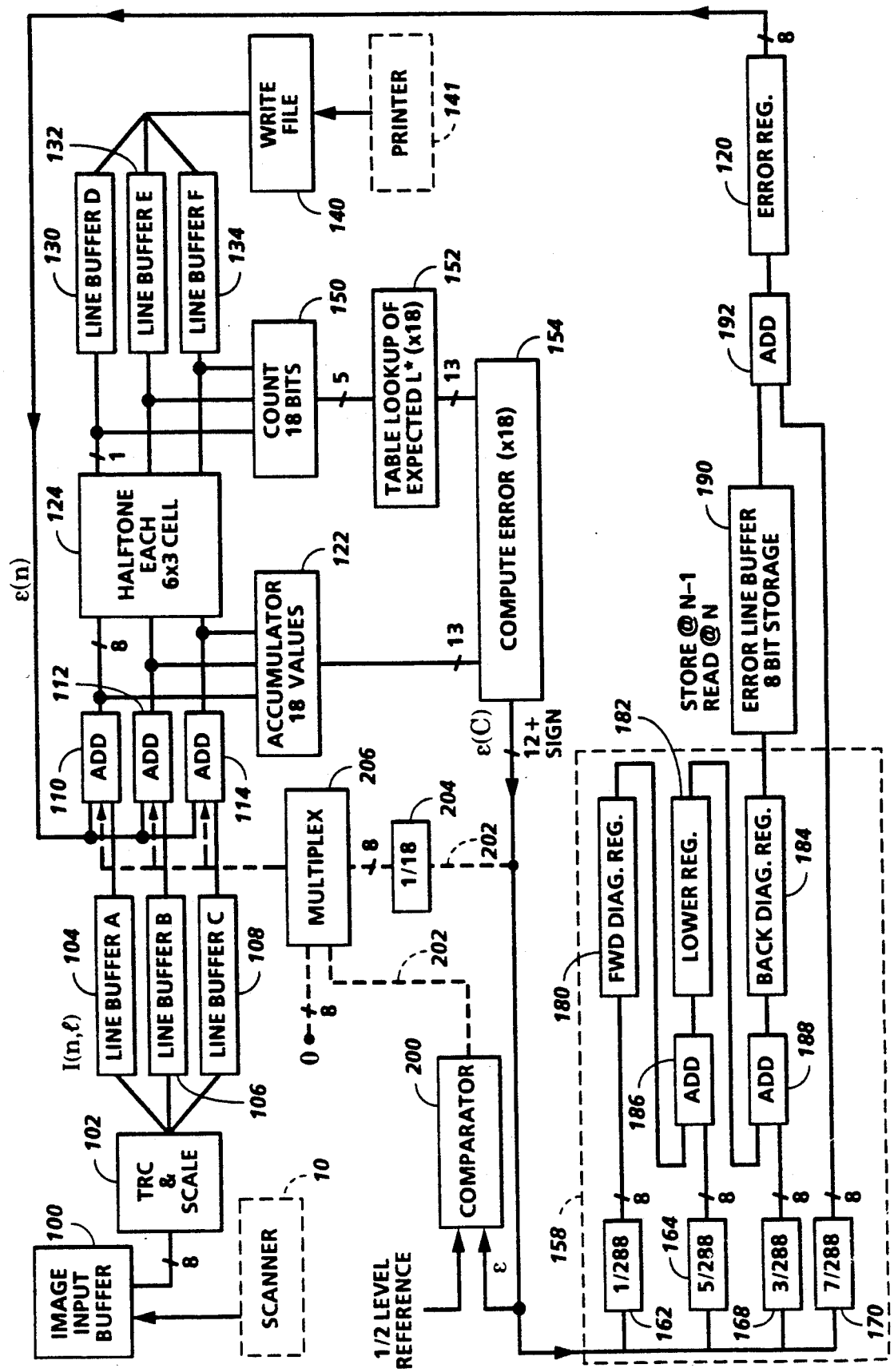

CLUSTERED HALFTONING WITH DOT-TO-DOT ERROR DIFFUSION

This invention relates to digital halftoning, combining the processes of halftoning, or dithering, and error diffusion on a dot-to-dot basis.

BACKGROUND OF THE INVENTION

Image information, be it color, black or white, is commonly generated in a bitmap format where the bitmap comprises a plurality of gray level pixels, i.e. pixels that are defined by digital values, each value representing a gray level among a number of gray levels. Thus, in an 8 bit system, 256 levels of gray are present, where each level represents an increment of gray between black and white. In the case of color bitmaps, where three defining colors or separations each include 256 levels of information, there may be more than 16 million colors defined by a gray bitmap.

Usually, bitmaps in such a gray level format are unprintable by standard printers. Standard printers print in a limited number of levels, either a spot or a no spot in the binary case, or a limited number of levels associated with the spot, for example, four in the quaternary case. Accordingly, it is necessary to reduce the gray level image data to a limited number of levels so that it is printable. Besides gray level information derived by scanning and computer generated images, certain processing techniques such as those described, for example, in U.S. patent application Ser. No. 07/821,125, entitled "Method for Image Conversion With Error Diffusion", by R. Eschbach, produce gray level pixel values which require conversion to a limited set of "legal" or output values.

One standard method of converting gray level pixel image data to binary level pixel image data is through the use of dithering or halftoning processes. In such arrangements, over a given area having a number of gray pixels therein, each pixel of an array of gray level pixels within the area is compared to one of a set of preselected thresholds (the halftone cell). The effect of such an arrangement is that, for an area where the image is gray, some of the thresholds within the halftone cell will be exceeded, while others are not. In the binary case, the pixels or cell elements for which thresholds are exceeded are printed as white, while the remaining elements are allowed to remain black. The effect of the distribution of black and white over the cell is integrated by the human eye as gray. Dithering or halftoning presents problems, however, in that the amount of gray within an original image is not maintained over an area, i.e. the error arising from the difference between the threshold value and the actual gray level value at any particular cell is simply thrown away. This results in a loss of image information. Halftoning also introduces coarse quantization artifacts which are visible in the image areas where the scene has little variation. This is also known as "banding". Clustered halftoning, usually required for electrophotographic printing, produces a monotonically growing halftone dot that can be calibrated for printing to compensate for dot gain. However, clustered halftones have a tradeoff between image sharpness and quantization of gray levels.

In the ARIES (Alias Reduction and Image Enhancement System) method of halftone reproduction. described by P. Roetling in "Halftone Method With Edge Enhancement and Moire' Suppression," J. Opt. Soc. Amer. Vol. 66, No. 10, pp. 985-989, October, 1976, image information initially has a set of halftone screen values for a cell added to the information. A uniform threshold value is applied to the screened information, to produce an output value. The average gray value over the cell area of the input image is compared to the average gray value over the cell area of the output image. See, also, U.S. Pat. No. 4,051,536 to Roetling and U.S. Pat. No. 4,633,327 to Roetling. In this way, the error between original and output is minimized over each halftone cell. The banding artifact, however, is not reduced.

Algorithms that convert gray images to binary or other number of level images attempting to preserve the local density exist, and include among them error diffusion, as taught, for example, in "An Adaptive Algorithm for Spatial Greyscale" by Floyd and Steinberg, Proceedings of the SID 17/2, 75-77 (1976) (hereinafter, "Floyd and Steinberg"). Another, more elaborate method that enhances edges of image would be the error diffusion techniques of U.S. Pat. No. 5,045,952 to Eschbach. Additional modifications to the error diffusion algorithm taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Image Processing, Vol. 5., pp. 13-40 (1976), and in "MECCA- A Multiple-Error Correction Computation Algorithm for Bi-Level Image Hardcopy Reproduction" by Stucki, IBM Res. Rep. RZ1060 (1981). Modifications of the error calculation and weight allocation have been taught, for example, in U.S. Pat. No. 4,924,322 to Kurosawa et. al., U.S. Pat. No. 4,339,774 to Temple, and U.S. Pat. No. 4,955,065, to Ulichney.

Error diffusion attempts to maintain gray by making the conversion from gray pixels to binary or other level pixels on a pixel-by-pixel basis. The procedure examines each pixel with respect to a threshold, and the difference between the gray level pixel value and the output value is forwarded to a selected group or set of neighboring pixels, in accordance with a weighting scheme. A problem noted with the use of the standard error diffusion algorithms for printing applications is the production of large numbers of isolated black and/or white pixels which are nonprintable by many types of printers. The algorithm taught by Billotet-Hoffmann and Bryngdahl, Proceedings of the SID, Vol. 24/3, (1983), pp. 253-258, shows a dither matrix used as a threshold for error diffusion, to alleviate the problems of undesired patterns generally produced by the error diffusion algorithm. A method to overcome the printability problem is taught by U.S. Pat. No. 4,654,721 to Goertzel, where a method is shown to convert a continuous tone image to a bilevel pixel image. The total error generated in one halftone cell is distributed to a predetermined number of adjacent halftone cells. In this way, printable images are generated, while the banding artifact is reduced, by alternating between fixed output cell patterns. Because of an inherent lack of partial dots in this process, evidenced as a loss in sharpness, edge detection and sharpening was included. See, also, "Digital Halftoning in the IBM 4250 Printer" by Goertzel et al. (Goertzel), IBM J. Res. Develop., Vol 31, No. 1, January, 1987. Additionally, the cell to cell error diffusion requires an offset that exactly corresponds to the halftone cells, Goertzel does not use Floyd and Steinberg error diffusion, instead introducing a random number generator to determine error weighting. Halftone dots are treated as fonts, and partial dotting is not used. U.S. patent application Ser. No. 07/583,337 to Shiau, and Ser. No. 07/775,201 to Fan, teach the use of similar methods to reduce a continuous tone image to a multilevel pixel image with diffusion of error between adjacent halftone cells. Fan considers the distinction between partial dots and full dots in determining error distribution.

In the MAE (Minimum Average Error) method of error diffusion described in "Images from Computers", by M. Schroeder, IEEE Spectrum, March 1969, pp. 66–78, a different error diffusion method is introduced, which determines error as a function of the original image and the output image (as opposed to the original image modified by error from previous pixels, and the output image). The result is less worming artifacts than Floyd and Steinberg, but a less precise gray tone reproduction.

U.S. Pat. No. 5,055,942 to Levien suggests another pixel based error diffusion scheme where the dot size in a screened image can be varied by applying a hysteresis constant and recursion techniques known from adaptive screening, to allow adjustment of image coarseness by adjustment of the hysteresis constant.

All of the references cited herein are incorporated by reference for their teachings.

SUMMARY OF THE INVENTION

In accordance with the invention, there is provided a method for quantizing gray level pixels using a combination of halftoning and error diffusion on a dot-to-dot basis.

In accordance with one aspect of the invention, there is provided a method of quantizing pixel values in an image formed by a plurality of pixels, each pixel representing an optical density of the image at a location within the image, and having an original optical density value selected from one of a set of 'c' original optical density values that has a number of members larger than a desired output set of 'd' optical density values through a process of combined halftoning and cell-to-cell error diffusion. Initially, each pixel is modified with a pro rata portion of an error term determined for a previous halftone cell, or from the current cell in a previous interaction. A set of modified pixels, corresponding in position to an m×n halftone cell, are processed in accordance with a standard halftoning process, to derive a set of output pixels at one of d optical density levels. The calculated output density is used to address a lookup table having a stored set of empirical density values upon printing the dot represented by a halftone cell with the same count of optical density levels. The empirical density value for the cell returned from the lookup table is compared to a sum of the modified pixel values for the cell. The difference (which represents the difference in gray level input and the actual output) is directed on a weighted basis to the pixels of subsequently processed dots.

In accordance with another aspect of the invention, there is provided an image processing system for use in quantizing multibit image signals, to prepare an image for printing at a printer, the image formed by a plurality of multibit image signals ordered in scan lines, each image signal representing an optical density of an original image at a discrete location therewithin, and having an original optical density selected from one of a set of 'c' original optical density levels that has a number of members larger than a desired output set of 'd' desired optical density levels: an input image buffer, suitable for storing at least a portion of a scanned image defined by multibit image signals and to which image signals are directed from a source thereof; a predetermined number of line buffers, functionally connected to the input image buffer to receive scan lines of image signals therefrom; a plurality of signal adders, corresponding in number to the line buffers, for adding image signals directed thereto from the line buffers and error term signals directed thereto from an error buffer, to produce modified image signals; halftoning means functionally connected to the signal adder means, converting each modified image signal in an m pixel×n pixel area of the image to printer output signals, the conversion process varying with each m×n area of the image based on a predetermined dot growth pattern; means directing the printer output signals to an output buffer, for transfer to a printer; means, responsive to the printer output signals, for determining density of the image over the m×n area, the density determining means responsive to the printer output signals; a printer response memory, storing a lookup table of empirical printer responses to printer output signals for an m×n area; means determining the difference between the stored empirical output density and the density determined from the density determining means, as a halftoning error; and, means for distributing the halftoning error on a weighted basis to a plurality of image signals forming halftone cells, the distributing means including an error buffer functionally connected to the signal adder means.

In accordance with still another aspect of the invention, the above arrangement is modified to provide an iterative process including: means for distributing the halftoning error to image signals in the halftone cell from which the error was derived, the distributing functionally connected to the signal adders; and second halftoning means, functionally connected to the signal adders, converting each modified image signal in an m pixel×n pixel area of the image to printer output signals, the conversion process varying with each m x n area of the image based on a predetermined dot growth pattern.

The described method has the effect of synchronizing the error diffusion process with a clustered halftoning process so that well formed printable dots are produced. Partial dotting found in halftoning is retained. Additionally, calibrated thresholds can be used as well as empirical measurements of dot performance, which can be varied on a printer to printer basis, so that actual error rather than theoretical error is diffused. The method also allows implementation in pipeline hardware as the image is processed serially.

These and other aspects of the invention will become apparent from the following descriptions to illustrate a preferred embodiment of the invention read in conjunction with the accompanying drawing in which:

The FIGURE is a block diagram showing a system in which the present invention may find use.

Referring now to the drawings where the showings are for the purpose of describing an embodiment of the invention and not for limiting same, a basic system for carrying out the present invention is shown in the FIGURE. In the present case, gray level image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. Here, color data may be represented by a number of independent channels or separations which are handled independently, or the color data might be represented as vector data in a predefined color space, e.g.: RGB, CIELab etc., being submitted to vector operations in the thresholding, error calculation and correction. One common case of this method includes the conversion of data from a relatively large set of gray levels to one of two legal or allowed binary levels for printing in a binary printer. In the present invention, the input signal is assumed to be normalized L* or luminance values.

As used herein, the term "dot" refers to a product or an image resulting from a halftoning process. A "halftone cell", as used herein, refers to the set of pixels which together will form the dot. A "pixel" refers to an image signal associated with a particular position in an image, having a density between white and black. A dot is made up of a plurality of pixels. While printers print pixels (sometimes referred to as "spots") halftoning methods tend to cluster the pixels together into a dot. Dots of clustered pixels have better reproduction characteristics than unclustered pixels.

An input image of the type to be processed as hereinafter described may be represented by a set of gray signals (gray pixels) arranged in an array of L scanlines, each line containing N gray pixels each defined at a level varying between a minimum and a maximum, with depth b, with any gray pixel in the array denoted by I(n,l). Each pixel is therefore defined by its optical density, and position in the image. Gray values or levels for gray pixels are typically expressed as integers, with one example falling in the range from 0 to 255, although greater or lesser number of levels, as well as non-integer representations, are possible. The output image is considered to consist of pixels, each pixel corresponding to a printer signal that will drive a printer or display to produce a spot. A scanner 10, exemplified by the Xerox 7650 Pro Imager Scanner, produces such gray signals from a linear array of photosensitive devices, which sense light reflected from a document thereto, and produce an electrical response indicative of light intensity. Alternatively, a computer workstation, operating in accordance with a gray level image creator, may produce the same multibit image signals that described a gray image for display on a display screen or for direction to a printer. In accordance with appropriate clocking sequences, multibit gray image signals are directed from the scanner to image input buffer 100.

With reference now to FIG. 1, multibit image signals I(n,l) are received at image buffer 100. The image signals may be optionally filtered to correct the scale or tone reproduction curve of the image at filter 102. A set of scan lines $I(n,l_1)$, $I(n,l_2)$, $I(n,l_3)$ are stored from filter 102 to line buffers A, B and C (respectively numbered, 104, 106 and 108). Of course, more scan lines might be buffered and used in the process to be described, to an advantageous effect. Each line buffer 104, 106 and 108 is respectively connected to an input of signal adders 110, 112, and 114. A second input of signal adders 110, 112, and 114 is connected to error register 120, so that an error term signal $\epsilon(n)$ stored therein for each pixel n in the halftone cell C may be added thereto accordingly as it is processed through the system to generate a modified image signal. In one embodiment of the invention, the modified image signal is clipped, so that it remains within and does not exceed a range of possible values between black and white (for an 8 bit system, 0 and 255). The outputs of signal adders 110, 112, and 114, represented generally as the modified image signal $I(n,l)+\epsilon(C)$ are connected to a modified image signal accumulator 122, which accumulates or algebraically adds the modified image signals for each pixel in a set corresponding to halftone cell C. The outputs of signal adders 110, 112, and 114, are also connected to a halftone processor 124, which produce from the modified image signals $I(n,l)+\epsilon(n,l)$ a set of output printer signals B(n,l) that are members of a set of d optical density values, and will form the bitmap of the image to be reproduced at a printer.

While halftoning may be described for simplicity as the addition of a set of selected screen values to image signals within a defined area of the image, in conjunction with a uniform application of a threshold level(s) to the combined values, it will be understood that the process of halftoning may also be represented by a set of varying thresholds defined at locations corresponding to pixels over a given area of the image. A halftone cell, as used herein, is generally smaller than the total image and will be replicated in a predetermined scheme for processing the image in order to cover an area of the image. A method for an efficient representation of variable angle halftone cells by a dither matrix and a corresponding replication scheme, is given in U.S. Pat. No. 4,149,194 to Holladay. The output of a process using a dither matrix is a set of pixel values, having a number of members less than the input set of values. Commonly, the set of output values is binary, either black or white, or a spot or no spot, although the values might be gray as described in U.S. patent application Ser. No. 07/583,337 by Shiau. The binary output of a single halftone cell is a set of pixels that are either black or white which together form a "dot". Single pixels, black or white, surrounded respectively by white or black pixels, are difficult to print with electrophotographic devices. For this reason, standard dither matrices for electrophotographic applications tend to cluster pixels together, with a growth pattern that begins in a central area of the halftone cell and grows as more elements of the cell are black. Such a dot pattern is printable on electrophotographic devices. In the present embodiment, the halftone cell is assumed to produce an 19 level dot, at 45°, in a 3×6 Holladay format. Such a dot is applicable for a wide range of printers ranging in resolution from 300 to 600 spi, and is useful in high addressability printers as well. While using such a dot may result in a phase shift so that in one row of dots the highlight may be on the left half of the cell, and then on the right half of the cell for the next row of dots, this will have little effect on the passing of error since each cell will always contain one complete halftone cell.

The output of halftone processor 124 is the set of image signals B(n,l) which in a binary system is a set of binary, or black and white pixels. Scan lines of B(n,l) are incrementally stored to line buffers 130, 132 and 134, from which the scan lines are directed to an output buffer 140 for printing at printer 141. Image signals B(n,l) for each halftone cell are also directed to a counter 150, which counts each black (or white) pixel that results from the halftoning process. The count, which in the described example is in the range of 0–18, is used to select an address from a lookup table, which has stored therein a set of possible printer dot densities resulting from the given dot determined at halftone processor 124. Due to possible high frequency image content and the partial dot process, this printer dot density may not correspond exactly to the density of the normal clustered halftone cells that are used for calibration, but overall correction is in the right direction. In the case of a multilevel pixel output (d>2) the densities can be summed, as with accumulator 122, to derive the addresses for a lookup table.

The densities stored at look up table 152, which may be conveniently stored in a ROM memory or the like, may be derived by a densitometer scan of a page printed by the printer to be used, or by a document scanner operating as a densitometer to scan a page printed by the printer to be used, or by a prediction of density made with knowledge of the printers physical process for printing. The table is scaled by the number of pixels in a halftone dot, or by a factor of 18 for the example given.

Error $\epsilon$ is computed at Computer Error 154, which is essentially a combination sign changer or inverter and adder. At Computer Error 154, the difference between the printer dot density (i.e., the density of the halftone cell) from lookup table 152 and the gray image signals over the dot area (the sum of the modified image signals determined at Accumulator 122) is determined. This cell error signal $\epsilon(C)$ is passed to error portion determination 158 where fractional error signals are calculated and passed to error term signal buffer 120 to be used in the processing of subsequent halftone cells.

Since error was determined on a per dot basis, as opposed to a pixel-by-pixel determination, but will be added to pixels in succeeding cells, the error determined at Computer Error 154 is initially directed through a set of lookup tables 162, 164, 168 and 170, which, for a given error signal, produce an output signal representing a single pixel error and the diffusion weighting. The weighting shown in the present invention is the standard Floyd-Steinberg weighting, although it is well within the scope invention to choose another weighting, such those shown as Stucki, Jarvis, U.S. Pat. No. 4,924,322 to Kurosawa et. al., U.S. Pat. No. 4,339,774 to Temple, and U.S. Pat. No. 4,955,065, to Ulichney, U.S. patent application Ser. No. 07/672,987 to Eschbach, or U.S. patent application Ser. No. 07/802,809 to Eschbach, and others. Recognizing that the error term $\epsilon(C)$ that will be added to the pixels of any particular is the sum of all the error portions of $\epsilon$ that are determined to be directable to such cells, FWD DIAG ter 180, LOWER register 182 and BACK DIAG register 184, and adders 186 and 188 are used to produce the required combination of fractional error signals for storage at error line buffer 190. As required by the cell being processed, the output of table 170 is added with the output of error line buffer 190 at adder 192 to produce the appropriate error $\epsilon(C)$ for next cell. The output of adder 192 is stored at error term register 120, for subsequent addition to each pixel in the appropriate cell. One value of error (stored at error register 120) is added to every pixel in the cell.

In a variation of the described scheme, an iterative process may be used that allows the computed error $\epsilon(C)$ to be added to the same cell in which it was derived. Thus, after determining the difference between the modified input signal and the output signal in a first halftoning process, the error determined may be added to the image signal for a second iteration, with the effect that the average value of the output halftone cell is incrementally moved closer to the average value of the input cell. In accordance with this embodiment, cell error signal $\epsilon(C)$ is passed (along the dotted line 202) through a multiplier 204 which accounts for the fact that cell error signal $\epsilon(C)$ represents cell error to be added on an individual basis to pixels. The resulting signal is multiplexed at multiplexer 206 for addition to image signals in each scan line at adders 110, 112 and 114. To prevent unwanted enhancement of unusual partial dot conditions, error signal $\epsilon(C)$ can be clipped to ±0.5 levels. This may also render the process more stable. Thus, it can be seen that, the compute error function 154 is functionally connected to signal adders 110, ignoring the intervening signal conditioning steps required for correct error addition. To accommodate the delay and to provide for pipeline processing of the image signals, a second halftoning function may be added, functionally similar to the first.

The invention is clearly extendible to color, wherein the one embodiment of the process follows the steps of:
a) Reading RGB (for example, tristimulus values describing the image in three separations) files and converting the values to Lab* color space (a luminance-chrominance color space);
b) Adding error generated from previous processing to each pixel;
c) Generating Cyan, Magenta, Yellow and Black (printer colorants) separations representing the image using a color correction transform and an under color removal algorithm;
d) Halftoning the gray values for each separation using angled screen halftone methods such as taught by Holladay, and dot-on-dot halftones;
e) Determining the average Lab* value over the halftone cell area from the input values;
f) Determining actual area coverage in each of the CMYK separation from the halftone output;
g) Determining approximate printed Lab* output by table lookup of area coverage of the cell into an empirically derived table (converting the image into toner colorant values;
h) Calculate the error by subtracting the empirical Lab* values from the desired Lab* and distributing the error to the surrounding unprocessed cells in accordance with a Floyd & Steinberg distribution weighting.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. An image processing system for use in quantizing multibit image signals, to prepare an image for printing at a printer, said image formed by a plurality of multibit image signals ordered in scan lines, each image signal representing an optical density of an original image at a discrete location therewithin, and having an original optical density selected from one of a set of 'c' original optical density levels that has a number of members larger than a desired output set of 'd' desired optical density levels, said image processing system including:
an input image buffer, suitable for storing at least a portion of a scanned image defined by multibit image signals and to which image signals are directed from a source thereof;

a predetermined number of line buffers, functionally connected to said input image buffer to receive scan lines of image signals therefrom;

a plurality of signal adders, corresponding in number to said line buffers, for adding image signals directed thereto from said line buffers and error term signals directed thereto from an error buffer, to produce modified image signals;

halftoning means functionally connected to said signal adder means, converting each modified image signal in an m pixel×n pixel area of the image to printer output signals, said conversion process varying with each m×n area of the image based on a predetermined dot growth pattern;

means directing said printer output signals to an output buffer, for transfer to a printer;

means, responsive to said printer output signals, for determining density of the image over the m×n area, said density determining means responsive to said printer output signals;

a printer response memory, storing a lookup table of empirical printer responses to printer output signals for an m×n area;

means determining the difference between the stored empirical output density and the density determined from said density determining means, as a halftoning error;

means for distributing said halftoning error on a weighted basis to a plurality of image signals forming halftone cells, said distributing means including an error buffer functionally connected to said signal adder means.

2. The device as defined in claim 1, wherein said distributing means includes:

means for distributing said halftoning error to image signals in the halftone cell from which the error was derived, said distributing functionally connected to said signal adders; and second halftoning means, functionally connected to said signal adders, converting each modified image signal in an m pixel×n pixel area of the image to printer output signals, said conversion process varying with each m×n area of the image based on a predetermined dot growth pattern.

3. The device as defined in claim 1, wherein said distributing means includes:

means for distributing said halftoning error to image signals in a set of adjacent, unprocessed halftone cells, said distributing means including a set of delay registers, for storing the error, and functionally connected to said error buffer.

4. The device as defined in claim 1, wherein said density determining means includes an adding means, adding the density level of each image signal in the m×n area to determine the density thereof.

5. The device as defined in claim 1, wherein "d" equals two, and said density determining means includes a counter means, incrementing a count for each image signal in the m×n area defined at the second of the two levels.

6. A method of quantizing image signals in an image formed by a plurality of multi bit image signals for use at an output device, each multi bit image signal representing the magnitude of density of the image at a location therewithin and having an original optical density level selected from one of a set of 'c' original optical density levels that has a number of members larger than a desired output set of 'd' desired optical density levels required for the output device, including the steps of:

at an image buffer, receiving from an image signal source a halftone cell set of image signals having original optical density levels selected from the set of 'c' original optical density levels, said image signal set corresponding to a halftone cell;

at a signal adder, modifying each image signal in the halftone cell set with an single error term signal derived from processing at least one previous halftone cell, and obtained from an error buffer memory;

at a first accumulator, determining an input density of an area corresponding to the halftone cell, from the modified image signals in the halftone cell set;

at a halftoning means, determining from the modified image signals a representative set of output device signals, said determination process varying with each m×n area of the image in accordance with a predetermined dot growth pattern;

directing said output device signals from said halftoning means to the output device;

determining an output density of the area corresponding to the halftone cell from output values of the image signal corresponding to the cell;

using said determined output density as an address in a lookup table stored in RAM memory, said table producing an empirical output density, indicative of the output device response to said output device signals;

calculating means for determining the difference between a density defined by said modified input signals and said empirical output density within the m×n area as halftoning error;

storing a portion of said halftone error in said error buffer, to be added to image signals in at least one halftone cell.

7. The method defined in claim 6, wherein said step of storing a portion of said halftone error in said error buffer includes:

providing a functional connection of said calculating means and said signal adders, to add said halftoning error to said halftone cell from which said halftoning was derived.

8. The method as defined in claim 6, wherein said step of storing a portion of said halftone error in said error buffer includes:

with a set of delay registers functionally connected to said error buffer, distributing said halftoning error received from said calculating means to image signals in a set of adjacent, unprocessed halftone cells.

9. The method as defined in claim 6, wherein "d" equals two, and said density determination is performed with a counter means, incrementing a count for each image signal in the m×n area defined at the second of the two levels.

* * * * *